United States Patent
Andrisin, III

[11] Patent Number: 5,393,122
[45] Date of Patent: Feb. 28, 1995

[54] ADJUSTABLE STROLLER RECLINING MECHANISM

[75] Inventor: John J. Andrisin, III, Parma, Ohio

[73] Assignee: Century Products Company, Macedonia, Ohio

[21] Appl. No.: 106,096

[22] Filed: Aug. 12, 1993

[51] Int. Cl.$^6$ ............................................. B60N 2/10
[52] U.S. Cl. ............................ 297/354.13; 280/47.38
[58] Field of Search ...................... 297/354.12, 354.13, 297/380; 280/47.38, 647, 658, 648; 24/68 R, 68 E, 69 ST, 71 ST, 169, 172, 182, 193, 197, 200

[56] References Cited

U.S. PATENT DOCUMENTS

| | | | |
|---|---|---|---|
| 820,710 | 5/1906 | Ford | 24/169 |
| 2,781,225 | 2/1957 | Heideman | 280/648 X |
| 4,385,769 | 5/1983 | Molino | 280/47.38 |
| 4,673,213 | 6/1987 | Bushey et al. | 297/380 X |
| 4,677,711 | 7/1987 | Anscher | 24/193 X |
| 4,805,928 | 2/1989 | Nakao et al. | 280/642 |
| 4,930,697 | 6/1990 | Takahashi et al. | 280/47.38 X |

Primary Examiner—Kenneth J. Dorner
Assistant Examiner—Milton Nelson, Jr.
Attorney, Agent, or Firm—Graham & James

[57] ABSTRACT

An adjustable reclining mechanism for a seat back of a baby stroller includes a seat back that is hinged to a stroller frame having opposed sides and a cross bar extending between the opposed sides above the seat back. A flexible web or belt extends from a medial portion of the upper edge of the seat back. Secured to the cross bar is a buckle that includes one end adapted to pivot freely about the cross bar, and an opposed tab end to facilitate manipulation of the buckle. The buckle includes a planar member having a pair of adjacent slots disposed to receive the belt extending from the seat back. The web is frictionally immobilized by the buckle when the planar member is disposed generally vertically. When the planar member is rotated to a substantially horizontal disposition, the belt is free to translate through the slots of the buckle. To adjust the angle of reclination of the seat back, the user engages the tab of the buckle to rotate the buckle horizontal and free the belt to translate through the slots of the buckle. The belt end may be pulled to shorten the length extending from the buckle to the seat back and raise the seat back toward an upright position. To further recline the seat back, the user supports the seat back with one hand to permit the seat back to tilt back safely while the buckle is held in the horizontal position with the other hand.

5 Claims, 3 Drawing Sheets

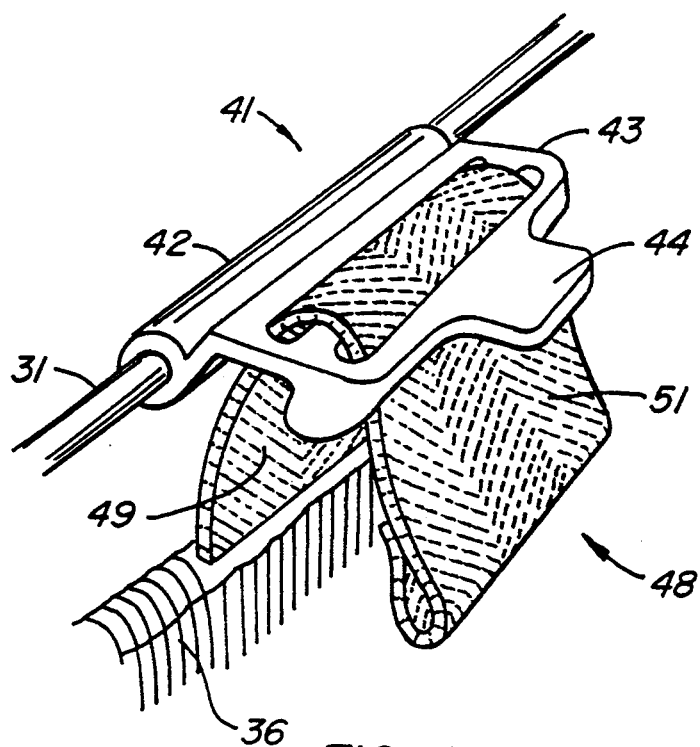
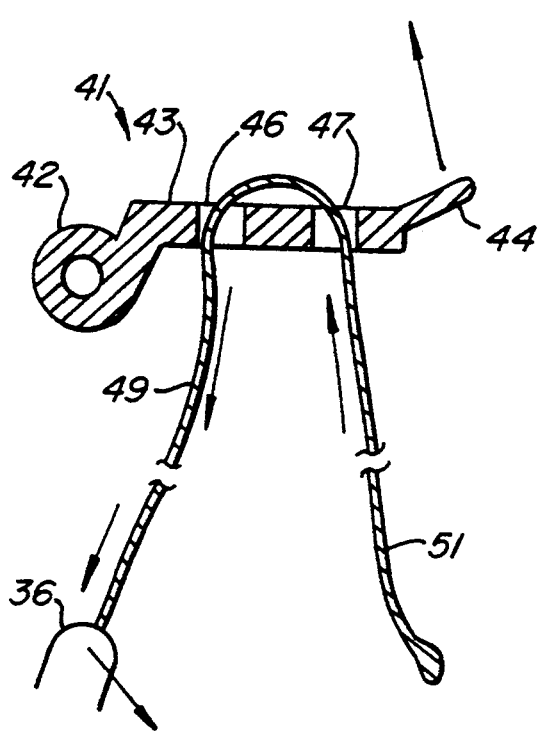
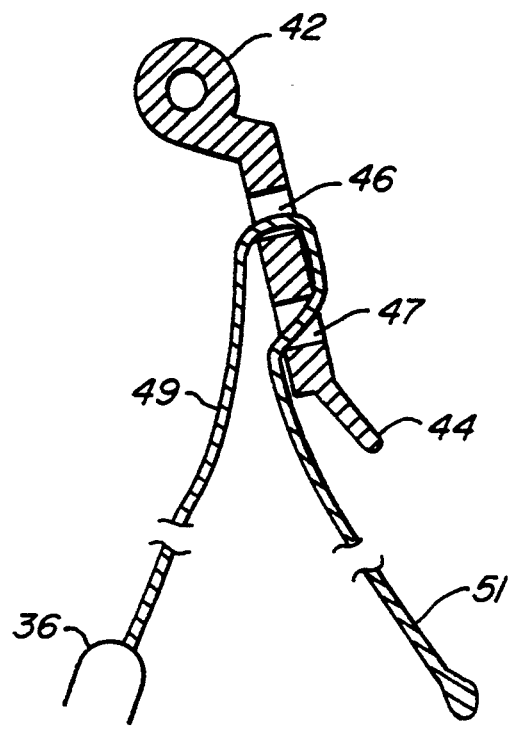
FIG. 1.
FIG. 2.
FIG. 3.

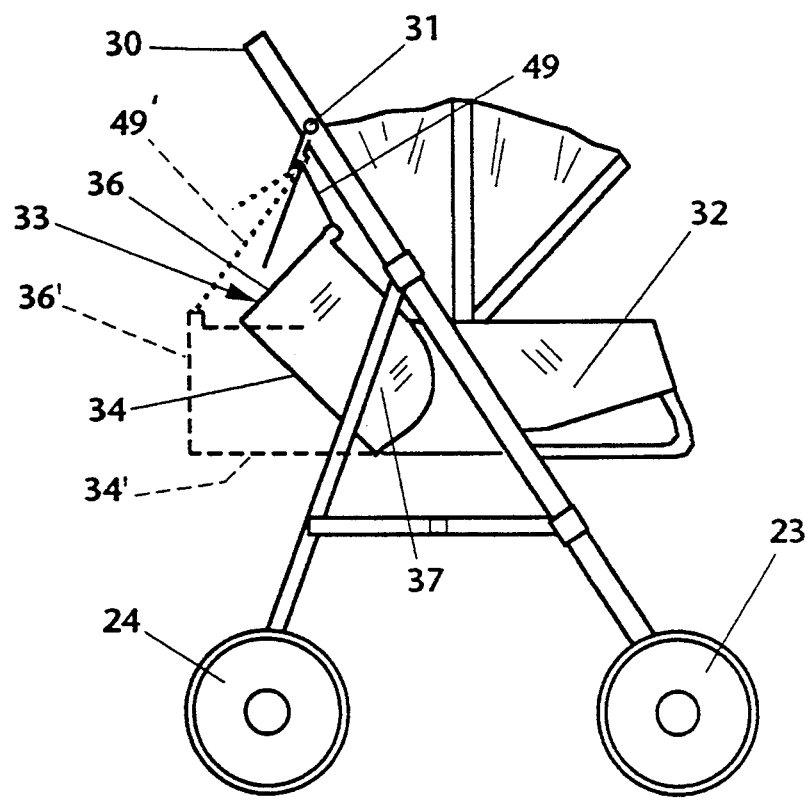
Figure_4
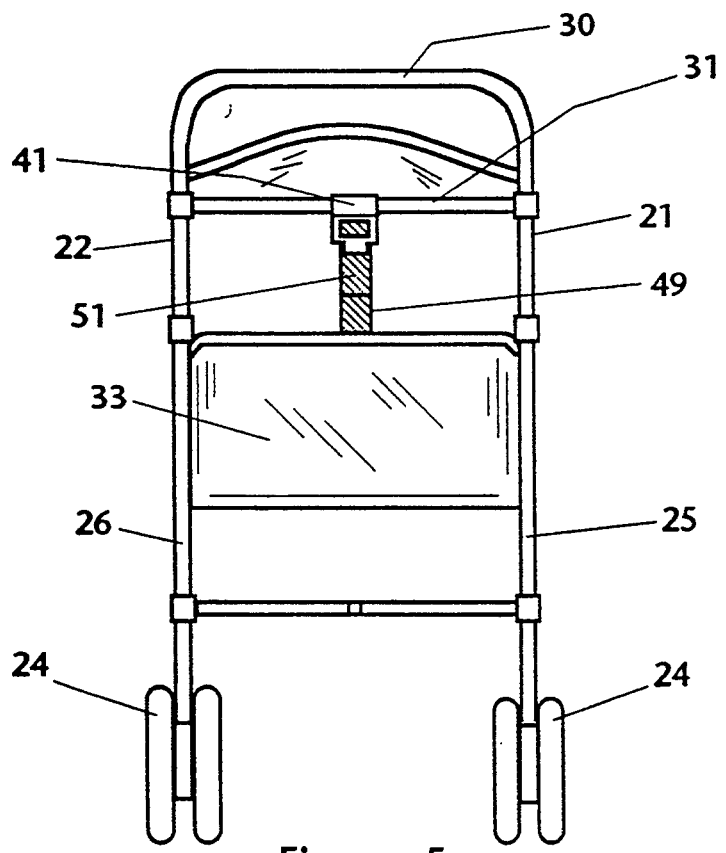
Figure_5

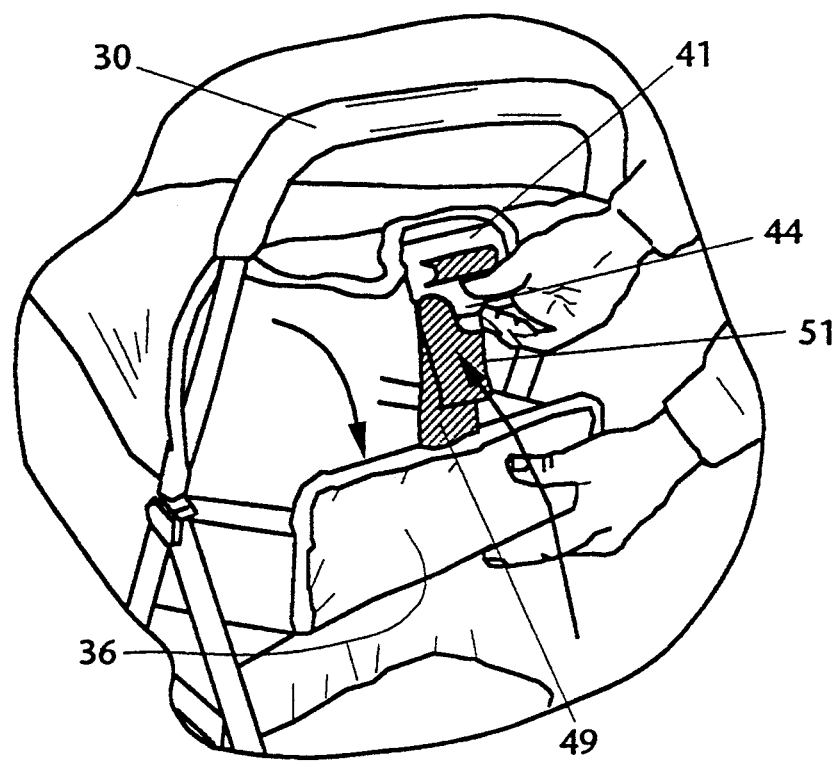
Figure_6
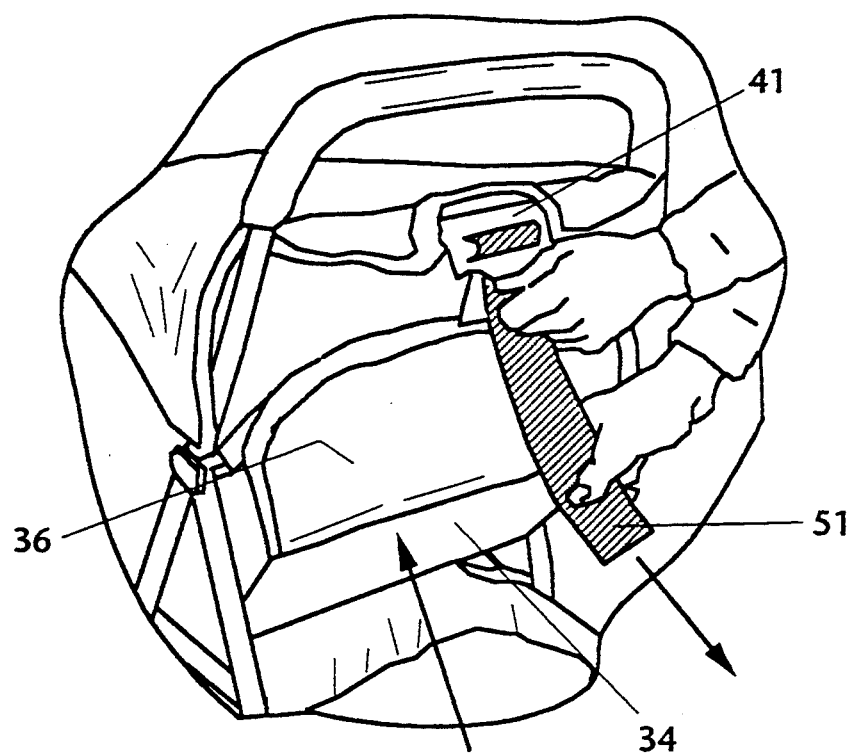
Figure_7

ADJUSTABLE STROLLER RECLINING MECHANISM

BACKGROUND OF THE INVENTION

This invention generally relates to reclining back mechanisms for a support frame, and more particularly to an adjustable reclining back mechanism for use with baby strollers, baby carriages, high chairs, walkers, seats, and similar perambulatory furniture for children and babies.

Baby strollers and carriages are designed to transport babies and toddlers comfortably whether awake or asleep. Many modern stroller designs include a reclining back mechanism which permits the rider both to sit up and observe the passing scene and to pivot downwardly to facilitate sleeping. Indeed, small children are often lulled to sleep by the pleasant motion of the stroller, and it is important to be able to recline the seat back smoothly and easily to permit the child to continue sleeping without interruption.

In addition, there is a need to adjust the seat back to various positions between fully reclining and fully upright, to carry children of different sizes, to accommodate pillows and blankets, to change the reclining posture of the child, to facilitate feeding during travel, and the like.

In the prior art there are known various arrangements to permit reclining the seat back of a stroller to various selected angles. Generally speaking, such arrangements include the tubular sides of a stroller frame member to support the seat, a plurality of detents formed or secured to the stroller sides, and some form of latch that secures the upper portion of a reclining seat back to the detents. The latch may include pins extending from opposed sides of the seat back, or a rod extending the width of the seat back, and the detents often comprise slots or stops extending from the sides and disposed to receive the pins or rod ends of the back. These arrangements are exemplary only; often there are additional links and bars interposed in the mechanism.

Prior art reclining arrangements for strollers suffer from at least two significant drawbacks. First, the seat back can only be reclined to angular positions defined by the slots or stops defined by the detent members. There is no opportunity for selecting a desired reclination according to the needs of the child; rather, a reclination defined by the detent members that is closest to the desired position must be employed. In addition, the reclining arrangements generally rely on engagements between the sides of the reclining back and both the left and right sides of the stroller frame. Reorienting the stroller mechanism so that both sides engage corresponding detent stops or slots while also monitoring the safety of the child in the stroller can require more manual dexterity than possessed by many individuals. Furthermore, the normal aging of aluminum surfaces and plastic surfaces reduces their lubricity, so that a reclining mechanism that operates smoothly when new may become erratic and sticky due to increasing friction between the detents and the pins or rods that engage them.

SUMMARY OF THE INVENTION

The invention comprises a novel reclining mechanism for a seat back of a baby stroller or the like. A salient feature of the mechanism is that a single adjustment mechanism located medially with respect to the sides of the stroller links the stroller frame to the seat back, so that the difficulties in adjusting both left and right sides of a prior art mechanism are obviated. Moreover, the reclining mechanism provides infinite selectivity throughout the adjustment range, so that the precise desired reclination of the seat back may be selected easily and quickly.

The reclining mechanism includes a seat back that is hinged to a stroller frame having opposed sides and a cross bar extending between the opposed sides above the seat back. A flexible web or belt is secured to the seat back and extends from a medial portion of the upper edge of the seat back. Secured to the cross bar is a buckle that includes one end adapted to pivot freely about the cross bar. The other, opposed end of the buckle includes a tab to facilitate manipulation of the buckle. The buckle includes a planar member having a pair of adjacent slots disposed to receive the belt extending from the seat back. The web is frictionally immobilized by the buckle when the planar member is disposed generally vertically. When the planar member is rotated to a substantially horizontal disposition, the belt is free to translate through the slots of the buckle.

The belt is generally under tension, due to the fact that the weight of the seat back and the child supported thereby is transferred through the belt and the buckle to the cross bar of the stroller. The belt tension pulls the planar buckle member into a generally vertical disposition, thereby locking the belt in the buckle and holding the seat back in a reclining or upright position determined by the length of belt extending from the buckle to the seat back. To adjust the angle of reclination of the seat back, the user engages the tab of the planar buckle member to rotate the buckle about the cross bar from vertical toward horizontal. As the buckle assumes a generally horizontal disposition, the belt is freed to translate through the slots of the buckle. The belt end may be pulled to shorten the length of belt extending from the buckle to the seat back and raise the seat back toward an upright position. To further recline the seat back, the user supports the seat back with one hand to permit the seat back to tilt back safely while the buckle is held in the horizontal position with the other hand.

BRIEF DESCRIPTION OF THE DRAWING

FIG. 1 is a perspective view of the adjustable stroller reclining mechanism of the invention.

FIG. 2 is a cross-sectional view of the adjustable stroller reclining mechanism, shown in the free adjustment configuration.

FIG. 3 is a cross-sectional view of the adjustable stroller reclining mechanism, shown in the locked adjustment configuration.

FIG. 4 is a side elevation of a typical stroller equipped with the adjustable reclining mechanism of the invention.

FIG. 5 is a rear elevation of a typical stroller equipped with the adjustable reclining mechanism of the invention.

FIG. 6 is a perspective view of the rear of a typical stroller showing the use of the adjustable reclining mechanism to recline the stroller seat back.

FIG. 7 is a perspective view of the rear of a typical stroller showing the use of the adjustable reclining mechanism to raise the stroller seat back.

DESCRIPTION OF THE PREFERRED EMBODIMENT

The invention generally comprises an adjustable seat back reclining arrangement for use with baby strollers, carriages, chairs, and similar apparatus. With regard to FIGS. 4 and 5, a typical prior art stroller construction includes a collapsible frame generally comprised of left and right side members 21 and 22 that are joined at their lower ends to front wheel assemblies 23. A handle 30 extends transversely to the upper ends of the side members and is secured therebetween, and a crossbar strut 31 spaced below the handle is also joined between the side members 21 and 22. Left and right rear struts 25 and 26 are hinged at their upper ends to respective side members, and secured at their lower ends to respective rear wheel assemblies 24.

A seat assembly 32 is secured between the left and right side members 21 and 22, and a seat back assembly 33 is supported between the rear struts 25 and 26. The seat back assembly 33 includes a bottom panel 34, a rear panel 36 extending upwardly from the rear end of the bottom panel 34, and opposed sides 37 which either overlap or are conjoint with the side portions of the seat 32. The bottom panel 34 is hinged to the back edge of the seat 32, so that the seat back assembly 33 may be reclined. Thus, as shown in FIG. 4, the seat bottom panel 34 may be inclined upwardly to comprise a back rest for the child carried in the stroller, or may be reclined fully, as shown at 34', to comprise the rear portion of a horizontal bed for the child. In the fully reclined position the back panel 36' encloses the rear of the bed to enclose and secure the child safely.

There are many variants and optional features incorporated in prior stroller constructions which are not relevant to the mechanism of the invention for adjustably reclining the seat back assembly 33 with respect to the seat assembly 32 and the stroller frame. With regard to FIGS. 1-3, the adjustable reclining mechanism includes a buckle 41 having a tubular portion 42 secured in freely pivoting fashion about the cross bar strut 31 of the stroller frame. The buckle also includes a generally planar portion 43 extending from the tubular portion 42, and a tabular portion 44 extending from the edge of the portion 42 opposed to the tubular portion 42. The planar portion 43 includes a pair of slots 46 and 47 extending therethrough and disposed generally parallel with the tubular portion 42. The buckle may be formed of stamped or cast metal, or molded plastic, or the like.

The adjustable reclining mechanism further includes a strap or belt 48 linking the seat back panel 36 and the stroller frame. The belt 48 includes a portion 49 having one end sewn or otherwise joined to the seat back panel 36 and extending to loop through the slots 46 and 47 of the buckle 41. Another portion 51 of the belt 48 extends from the slot 47 of the buckle and depends therefrom. It may be appreciated that the weight of the seat back assembly 33 and the child supported thereby is transferred through tension in the belt portion 49 to the buckle 41, and thence to the cross bar strut 31 of the stroller frame. The buckle holds the seat back in a reclining or upright position determined by the length of belt extending from the buckle to the seat back.

It is significant that the buckle 41 permits free translation of the belt 48 through the slots 46 and 47 when the buckle portion 43 is disposed generally horizontally, as shown in FIG. 2. If the planar portion 43 is disposed generally more vertically, as shown in FIG. 3, the edges of the slots 46 and 47 frictionally engage the belt 48 and prevent translation of the belt through the slots. Generally, the weight of the seat back and the child supported thereby, when applied through the belt portion 49 to the buckle 41, causes the buckle to rotate about the strut 3 1 to a generally vertical disposition. Thus the buckle assembly is self-locking in any position set by the user. Moreover, the buckle and strap arrangement permits an infinite selectivity throughout the adjustment range.

When the seat back assembly 33 is disposed in an inclined, upright position as depicted in FIG. 4, the seat back assembly may be reclined as shown with reference to FIGS. 2 and 6. The tabular portion 44 of the buckle 41 is raised with one hand to permit the tension in the belt portion 49 to draw the portion 51 into and through the slots 46 and 47, while the other hand is used to support the seat back assembly to lower it (and the child) gently to a more reclined position.

With regard to FIG. 7, inclining the seat back assembly 33 to a more upright position requires that the user lift the tabular portion 44 with one hand to free the belt 48 in the slots 46 and 47, and that the belt portion 51 be pulled with the other hand to rotate upwardly and raise the seat back assembly.

The belt 48 may be provided with stops or the like that cannot pass through the slots 46 and 47 to limit the rotation of the seat back assembly. Thus, for example, a stop secured to the belt portion 51 may be placed to prevent the seat back assembly from being reclined beyond a horizontal disposition, and a stop secured to the belt portion 49 may be placed to prevent inclining the seat back assembly upwardly beyond a desired angle.

Although the buckle member 41 described and shown herein includes a pair of slots to engage the belt 48 in looping fashion, there are many other forms of buckles known in the prior art which are capable of engaging and releasing a belt for adjustment purposes.

It should be noted that the buckle 41 and strap 48 are disposed medially with respect to the sides of the stroller frame, so that rotation of the seat back assembly necessarily takes place in a plane parallel to the sides of the stroller. Furthermore, the provision of a single, medial adjustment mechanism eliminates the bilateral binding and misalignment of prior adjustment mechanisms. It may also be appreciated that the buckle may be secured to other structural portions of the stroller frame, such as the handle 30.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. An adjustable reclining mechanism for a stroller having an inclinable seat back assembly hinged to a stroller seat and a stroller frame having a structural member extending above the seat back assembly, comprising:

a narrow web member having one end portion joined to the seat back;

means for securing an opposed end portion of said web member to the structural member, whereby the inclination of the seat back is determined by the length of said web member extending between the seat back and the structural member;

wherein said means for securing includes buckle means for engaging said web member, said buckle means being movable from a first position in which said web member passes freely through said buckle means to a second position in which said web member is immobilized in said buckle means;

further including means for securing said buckle means to the structural member in freely pivoting fashion.

2. An adjustable reclining mechanism for a stroller having an inclinable seat back assembly hinged to a stroller seat and a stroller frame having a structural member extending above the seat back assembly, comprising:

a narrow web member having one end portion joined to the seat back;

means for securing an opposed end portion of said web member to the structural member, whereby the inclination of the seat back is determined by the length of said web member extending between the seat back and the structural member;

wherein said means for securing includes a buckle having at least one slot through which said web member is passed in half-loop fashion;

wherein said buckle includes a tubular portion to engage the structural member in freely pivoting fashion.

3. The adjustable reclining mechanism of claim 2, wherein said buckle includes a tabular portion for facilitating manual rotation of said buckle about the structural member.

4. The adjustable reclining mechanism of claim 2, wherein said buckle is rotatable from a first position in which said web member passes freely through said at least one slot to a second position in which said web member is immobilized in said at least one slot.

5. The adjustable reclining mechanism of claim 2, wherein said buckle is disposed medially with respect to the lateral extent of the structural member.

* * * * *